June 14, 1949.  E. G. DICKINSON ET AL  2,473,364
LITTER INSTALLATION FOR VEHICLES
Filed March 15, 1945  3 Sheets-Sheet 2

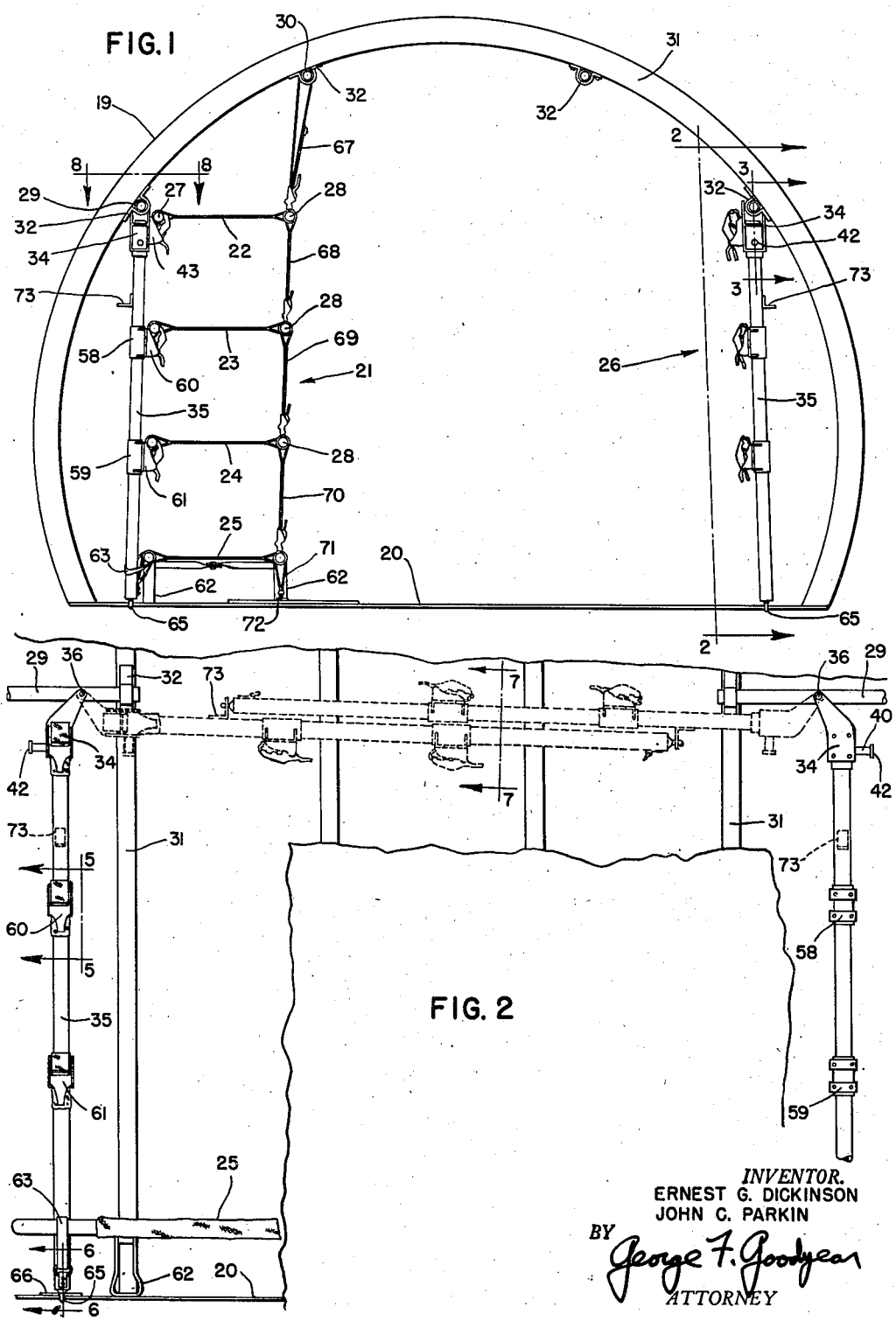

INVENTOR.
ERNEST G. DICKINSON
JOHN C. PARKIN
BY George F. Goodyear
ATTORNEY

June 14, 1949.  E. G. DICKINSON ET AL  2,473,364
LITTER INSTALLATION FOR VEHICLES
Filed March 15, 1945  3 Sheets-Sheet 3
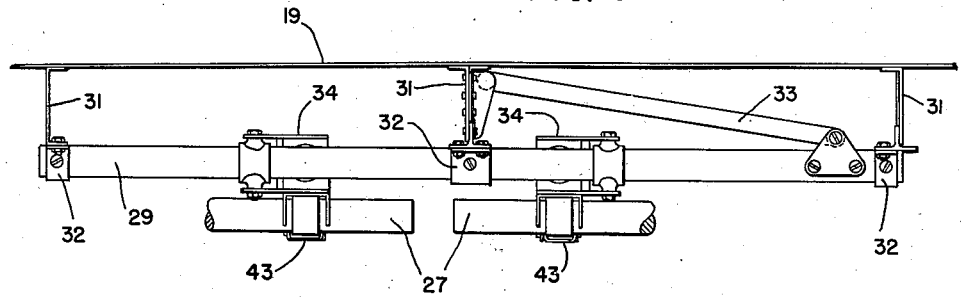
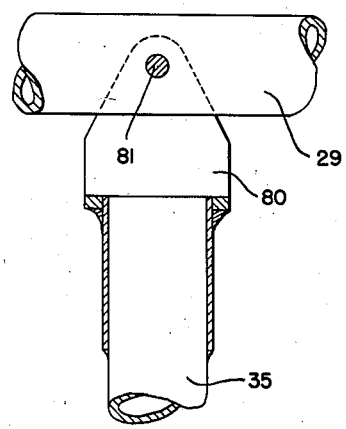
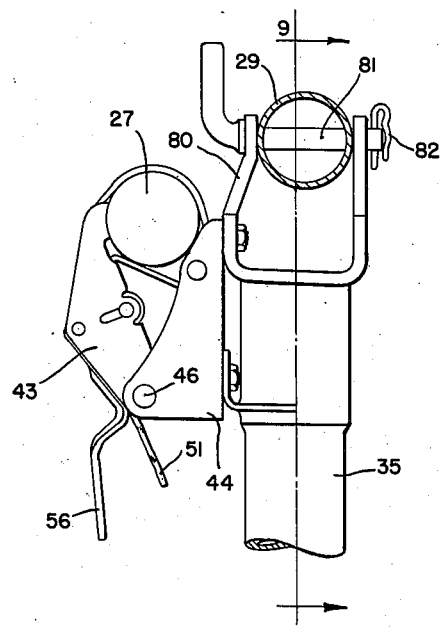
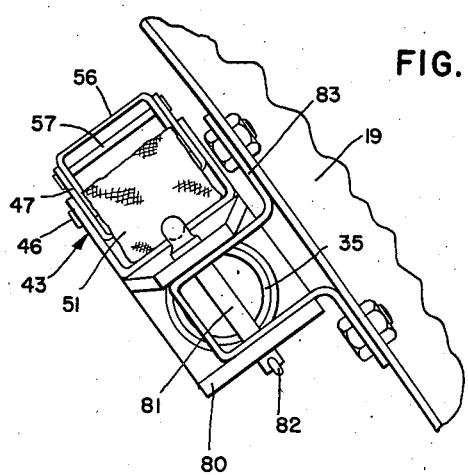
INVENTOR.
ERNEST G. DICKINSON
JOHN C. PARKIN
BY George F. Goodyear
ATTORNEY Patented June 14, 1949

2,473,364

UNITED STATES PATENT OFFICE 2,473,364

LITTER INSTALLATION FOR VEHICLES

Ernest G. Dickinson, Olcott, and John C. Parkin, Buffalo, N. Y., assignors to Curtiss-Wright Corporation, a corporation of Delaware Application March 15, 1945, Serial No. 582,974

4 Claims. (Cl. 5—9)

This invention relates to litter installations for vehicles. More particularly, it relates to litter installations for transporting the sick and wounded in transport aircraft.

In the design of equipment for suspending litters in a transport airplane, it is desirable to provide light equipment which can be readily stowed in a position to allow the space to be used for other purposes. At the same time, the equipment should be easily movable from its stowed to its operative position, so that the airplane can be used for the transportation of sick and wounded. Previous equipment to do this has been bulky, difficult to stow, and relatively heavy in construction, thereby reducing the pay load of the airplane.

It is therefore an object of this invention to provide a litter installation for vehicles, particularly transport aircraft. It is another object of this invention to provide a stowable litter support which can be readily positioned to receive litters. It is yet another object of this invention to provide a litter support which can be readily and easily stowed in an out of the way location. It is a further object of this invention to provide a litter support which can be utilized as a hand rail when the airplane is being used as a personnel transport or for other purposes. It is a still further object of this invention to provide a litter support which is comparatively rigid and not susceptible to the swaying inherent in strap type supports. A further object is to provide a simplified litter installation. Other objects will appear hereinafter.

Figure 4:
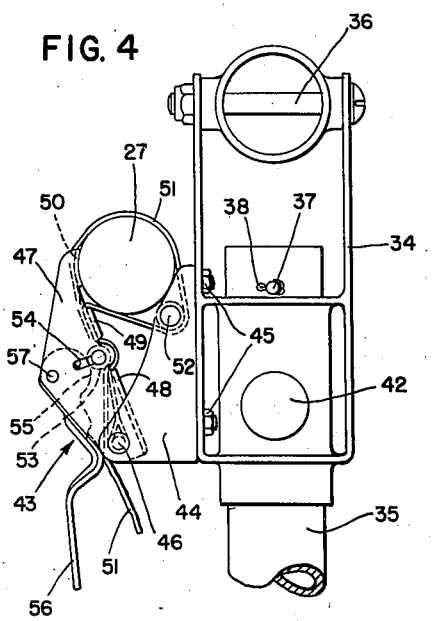
Figure 3:
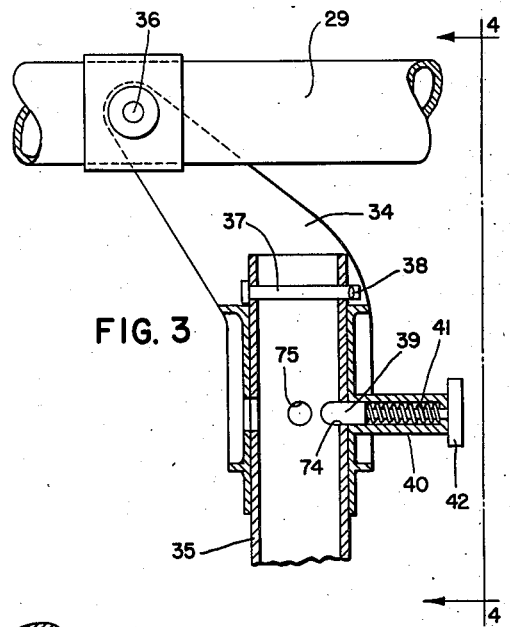
Figure 5:
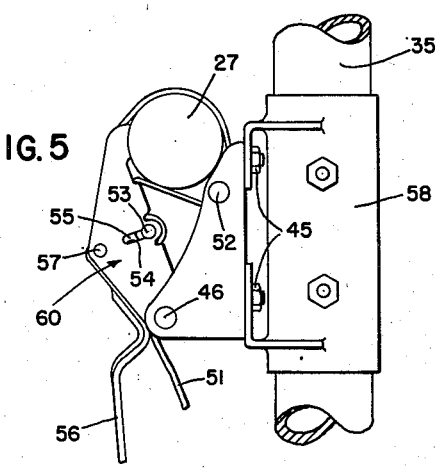
Figure 6:
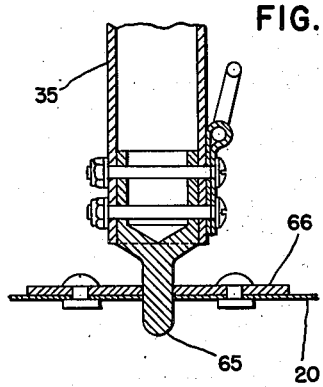
Figure 7:
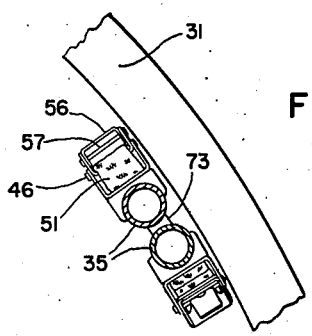

These objects are accomplished by the herein described invention, which may be more readily understood by reference to the accompanying drawings, in which: Figure 1 is a cross sectional view of an airplane fuselage with a litter installation according to the present invention in operative position. Figure 2 is a side elevation on a somewhat larger scale taken along the line 2—2 of Figure 1; Figure 3 is a view on a still larger scale taken along the line 3—3 of Figure 1; Figure 4 is a view taken along the line 4—4 of Figure 3; Figures 5 and 6 are views taken along the lines 5—5 and 6—6, respectively, of Figure 2, on the same scale as Figure 3; Figure 7 is a view taken along the line 7—7 of Figure 2, showing the litter supports in stowed position; Figure 8 is a view taken along the line 8—8 of Figure 1, on the same scale as Figure 7; and Figures 9, 10 and 11 are views of an alternative form of the invention, these views being analagous to Figures 3, 4 and 7, respectively.

In Figures 1 and 2, the litters are shown installed in two banks, one bank along each side wall of an airplane fuselage 19, each bank rising in four tiers from the floor 20 within the fuselage 19. The left hand bank 21 in Figure 1 is shown with the four tiers of litters 22, 23, 24 and 25, installed, while in the right hand bank 26 the litters are omitted. In Figure 2, the bottom litter 25 only is shown in position.

Referring to the form of the invention shown in Figures 1 to 8, inclusive, the supports for the inner poles 27 and outer poles 28 of the litters are attached to the fuselage 20 by means of support members comprising tubes 29 and 30, respectively. These tubes extend between adjacent bulkheads 31 in the fuselage 20. As shown in Figure 8, either or both of the tubes 29 and 30 may extend between three or more bulkheads 31, so as to distribute the loads somewhat more evenly. This is particularly desirable where a single tube 29 or 30 supports the ends of poles 27 or 28 for two adjacent sets of litters, as shown in Figure 8. Each tube is attached to the bulkheads 31 by means of brackets 32, and is braced against axial or longitudinal movement by means of a brace strut 33 attached to a bulkhead 31, as shown in Figure 8.

Pivotally attached to each tube 29, as shown in Figures 2, 3 and 4, by means of a bifurcated connecting member 34, is a stanchion or supporting pole 35. Bifurcated connecting member 34 is attached to tube 29 by means of a pin or pivot bolt 36, and is offset as shown so that the main axis of stanchion 35 does not pass through the pivot axis of pin 36. This construction permits the folding of stanchion 35 with respect to tube 29, for reasons as pointed out hereinafter, without interference with each other. Stanchion 35 is slidably and rotatably engaged in member 34, but is restricted in its downward movement with respect thereto by means of a stop pin 37 held in place by a cotter pin 38. It is also restrained from either axial or rotational movement by means of a plunger 39 riding in a socket 40 attached to or forming a part of member 34. The inner end of this plunger passes into a hole or seat 74 in stanchion 35 and serves to hold the stanchion firmly in position. Plunger 39 is held in position by means of a compression spring 41 bearing against a shoulder in socket 40, but can be withdrawn from its seated position by means of a finger hold 42 on the head of the plunger. When the plunger is thus withdrawn from engagement with stanchion 35, the stanchion can be rotated or can be moved axially, except as limited by the stop 37.

Affixed to the inner face of connecting member 34 is a fitting 43 (omitted from the right hand end of Figure 2 for clearness in illustration) for the attachment of litter 22. This fitting is shown clearly in Figures 1 and 4. It includes a bracket member 44 attached to the member 34 by means of bolts 45. A pin 46 extending between and affixed in the arms of bracket 44 provides a pivotal mounting for a second bracket member 47. The two arms of bracket 47 are connected by three spaced cross portions 48, 49 and 50, the upper cross portion 50 providing a jaw surface for bearing against a litter pole 27. One end of a fabric web 51 is formed with a loop around pin 46 and sewed to close the loop at this point. The free end of the web 51 is carried up between the arms of bracket 47 along the inner faces of cross portions 48 and 49, with a loop bulging out in the space between portions 48 and 49. The web 51 is then threaded between portions 49 and 50, then underneath the litter pole 27 and around a roller 52 carried between the arms of bracket 44. Thence it is carried over litter pole 27, down the inside of portion 50, and lies against a portion of the web previously described. A clamping roller 53 with its ends riding in slots 54 in the arms of bracket 47 holds the web 51 firmly in place when it is moved to the right so as to force the two thicknesses of the web 51 into the opening between cross portions 48 and 49. A cam plate 55, operated by a handle 56 and pivoted at 57 on bracket 47, is employed to force the clamping roller 53 into clamping position. By this construction it is seen that the litter pole 27 is held firmly in position by the web 51.

At spaced points along the stanchion 35 there is mounted a pair of sleeves 58 and 59, to which are affixed a pair of fittings 60 and 61, respectively, exactly similar in all respects to fitting 43, for the attachment of litters 23 and 24, respectively. The lowermost litter 25, on the other hand, rests on the floor 20 of the fuselage, by means of legs 62 which customarily form part of the litter. This litter 25 is lashed to the stanchion 35 by means of a strap 63, as shown.

The lower end of the stanchion 35 is furnished with a securing pin 65 affixed thereto. In the upright or vertical position of stanchion 35, the pin 65 rests in a socket formed in a plate 66 affixed to the floor 20. The stanchion may be removed from this position by withdrawing plunger 39 from its seat and then raising the stanchion 35 until it is clear of the floor 20. The reverse operation puts it into floor-engaging position.

The litter poles 28 are supported by means of straps. The uppermost litter 22 is supported by means of a strap 67 connecting the pole 28 to the support tube 30. The litter 23 is supported by means of a strap 68 connecting the poles 28 of litters 22 and 23. The litter 24 is supported by means of a strap 69 connecting the poles 28 of litters 23 and 24. The litter 25 rests on the floor 20 by means of legs 62, and is also supported by means of a strap 70 connecting the poles 28 of litters 24 and 25. Finally, pole 28 of litter 25 is lashed to the floor 20 by means of a strap 71 passing through a ring 72 mounted in the floor. By keeping straps 67, 68, 69, 70 and 71 taut, and by keeping the beds of litters 22, 23, 24 and 25 taut, the entire ensemblage is kept securely in position, by virtue of stanchion 35 and the support points 30 and 72.

The preceding description has mainly been with reference to a litter installation in its operative or active position. It is often desired, however, to use the airplane for other purposes, and under these circumstances it is desired to disassemble the litters and litter supports as quickly as possible and stow them away in a relatively small space. This is accomplished in the following manner.

The litter 25 is first removed by disconnecting straps 71, 63 and 70. Litter 24 is then removed by loosening the strap in fitting 61 and disconnecting strap 69. Litters 23 and 22 are then successively removed by loosening the straps in fittings 60 and 43, respectively, and disconnecting straps 68 and 67, respectively. The litters may then be folded and stored in suitable racks located on the walls of the fuselage 19. The straps 63, 67, 68, 69, 70 and 71 are also folded and placed in pockets located on the walls of the fuselage.

Each of the stanchions 35 is disconnected from the floor by withdrawing plunger 39 from its seat and then axially sliding the stanchion with respect to the member 34 until the pin 65 is clear of the floor. The stanchion 35 and fitting 34 are then swung upwardly towards the stanchion supporting the opposite end of the litter, which is at the same time swung upwardly towards the first mentioned stanchion. Both stanchions are simultaneously rotated (with respect to their associated members 34) through 90 degrees to swing the fittings 60 and 61 out of the way, and at the same time bring each pin 65 opposite a bracket 73 mounted on the opposing stanchion on the side opposite from the fittings 60 and 61. Each bracket 73 is provided with a hole or socket into which the opposing pin 65 is adapted to fit when the stanchions 35 are moved axially towards each other, until they reach the position shown in Figure 7 and in dotted lines in Figure 2. When this position is reached, each plunger 39 is released to engage a socket or hole 75 located in stanchion 35 in a position 90 degrees from the hole 74. This serves to hold the stanchions 35 firmly in their stowed positions, so that they may be used as hand rails if so desired. It will be seen that the two stanchions 35 illustrated in the right and left portions of Figure 2, for example, together with their respective supports 29 constitute a "pair" of stanchions which are mutually dependent for support in their stowed position.

To install the litter arrangement, the above operations are reversed.

Referring now to Figures 9, 10 and 11, there is shown therein a form of the invention which operates similarly to the form shown in Figures 1 to 8, inclusive, except for the stowing of stanchions 35. In this case the stanchions are directly attached to or are integral with a bifurcated member 80. This member is attached to the tube 29 by means of a removable pin 81 held in place by a cotter pin 82. In disassembling, the stanchion 35 may be entirely removed from the support member 29 upon removal of the cotter pin 82 and pin 81. It may be stowed by inserting the pin 65 in a socket in a suitable bracket similar to bracket 73 except that it is mounted on the wall of the fuselage 19, and engaging member 80 with a bracket 83, also on the wall of the fuselage, as shown in Figure 11. The stanchion is held in bracket 83 by means of pin 81 and cotter pin 82.

Although the invention has been described with reference to several specific forms thereof, it is understood that it is not to be limited except as defined by the appended claims.

We claim:

1. In a demountable litter installation for vehicles, a pair of support members attached to a wall of said vehicle, a connecting member pivotally attached to each said support member, a stanchion slidably connected to each said connecting member, said pivotal attachment of each said connecting member permitting swinging of its associated stanchion from a substantially vertical position to a substantially horizontal position adjacent to and substantially parallel to the other stanchion when the latter is correspondingly swung, a plurality of fittings adapted for supporting the ends of litter poles, said fittings being attached to said stanchions at spaced intervals, a first pair of sockets mounted on the floor of said vehicle, a second pair of sockets mounted one each on each said stanchion, a pair of socket engaging members on the lower ends of said stanchions adapted to engage said first pair of sockets in substantially vertical position and said second pair of sockets in substantially horizontal position of said stanchions, and means for selectively locking said stanchions against sliding movement with respect to said connecting members in either socket engaging position.

2. In a demountable litter installation for vehicles, a pair of support members attached to a wall of said vehicle, a connecting member pivotally attached to each said support member, a stanchion slidably and rotatably connected to each connecting member, said pivotal attachment of each said connecting member permitting swinging of its associated stanchion from a substantially vertical position to a substantially horizontal position adjacent to and substantially parallel to the other stanchion when the latter is correspondingly swung, a plurality of fittings adapted for supporting the ends of litter poles, said fitings being attached to said stanchions at spaced intervals, said rotatable connection of said stanchion with respect to said connecting member permitting turning of said litter supporting fittings to a stowed position, a first pair of sockets mounted on the flloor of said vehicle, a second pair of sockets mounted one each on each said stanchion, a pair of socket engaging members on the lower ends of said stanchions adapted to engage said first pair of sockets in substantially vertical position and said second pair of sockets in substantially horizontal position of said stanchions, and means for selectively locking said stanchions against sliding movement with respect to said connecting members in either socket engaging position.

3. In a demountable litter installation for vehicles, a support member attached to a wall of said vehicle, a connecting member pivotally attached to said support member, a stanchion slidably connected to said connecting member, a plurality of fittings adapted for supporting the ends of litter poles, said fittings being attached to said stanchion at spaced intervals, a socket mounted on the floor of said vehicle, a socket engaging member on the lower end of said stanchion, and means for locking said stanchion against sliding movement with respect to said connecting member in socket engaging position.

4. In a demountable litter installation for vehicles, a support member attached to a wall of said vehicle, a connecting member pivotally attached to said support member, a stanchion slidably connected to said connecting member, said pivotal attachment of each said connecting member permitting swinging of the stanchion from a substantially vertical position to a substantially horizontal position adjacent to and substantially parallel to a correspondingly swung similar and adjacent stanchion, a plurality of fittings adapted for supporting the ends of litter poles, said fittings being attached to said stanchion at spaced intervals, a first socket mounted on the floor of said vehicle, a second socket mounted on said stanchion, a socket engaging member on the lower end of said stanchion adapted to engage said first socket in substantially vertical position of the stanchion and said second socket adapted to engage the socket engaging member of an adjacent similar stanchion when the stanchions are in substantially horizontal position, and means for selectively locking said stanchion against sliding movement with respect to said connecting member in either socket engaging position.

ERNEST G. DICKINSON.
JOHN C. PARKIN.

REFERENCES CITED

The following references are of record in the file of this patent:

UNITED STATES PATENTS

| Number | Name | Date |
|---|---|---|
| 163,020 | Mahony | May 11, 1875 |
| 828,131 | Lein | Aug. 7, 1906 |
| 1,944,909 | Thomas | Jan. 30, 1934 |

FOREIGN PATENTS

| Number | Country | Date |
|---|---|---|
| 4,111 | Great Britain | 1890 |
| 321,763 | France | Sept. 18, 1902 |
| 8,514 | Great Britain | 1916 |